(12) United States Patent
Liu et al.

(10) Patent No.: US 7,599,957 B2
(45) Date of Patent: Oct. 6, 2009

(54) SYSTEM AND METHOD FOR HIGH PERFORMANCE TEMPLATE DRIVEN METADATA SCHEMA MAPPING AND DATA STORAGE FOR SURVEILLANCE AND SENSOR DEVICES

(75) Inventors: Lipin Liu, Belle Mead, NJ (US); Kuo Chu Lee, Princeton Junction, NJ (US); Juan Yu, Cranbury, NJ (US)

(73) Assignee: Panasonic Corporation, Osaka (JP)

( * ) Notice: Subject to any disclaimer, the term of this patent is extended or adjusted under 35 U.S.C. 154(b) by 227 days.

(21) Appl. No.: 11/354,758

(22) Filed: Feb. 15, 2006

(65) Prior Publication Data

US 2007/0192351 A1    Aug. 16, 2007

(51) Int. Cl.
G06F 17/00 (2006.01)
(52) U.S. Cl. ...................... 707/103; 348/142
(58) Field of Classification Search .......... None
See application file for complete search history.

(56) References Cited

U.S. PATENT DOCUMENTS

2001/0034733 A1* 10/2001 Prompt et al. ............... 707/102
2004/0130620 A1* 7/2004 Buehler et al. .............. 348/143
2006/0078047 A1* 4/2006 Shu et al. ................ 375/240.01
2007/0005635 A1* 1/2007 Martinez et al. ............ 707/102
2007/0083543 A1* 4/2007 Chen .......................... 707/102

* cited by examiner

Primary Examiner—Pierre M Vital
Assistant Examiner—Truong V Vo
(74) Attorney, Agent, or Firm—Harness, Dickey & Pierce, PLC

(57) ABSTRACT

A metadata database adaptor for use with a surveillance and/or sensor system is capable of adapting metadata messages of varying formats according to needs of metadata databases. In other aspects, a metadata data model template can allow a user to define a data definition that is used to map user defined data with the metadata data model template to form XML data schema. Template mapping knowledge can then be applied for fast XML data schema to non-XML database schema generation without translation processing. In yet other aspects, an application domain template can allow a user to define a query definition that can then be processed with a mapping of the application domain template to translate Xpath, Xquery, or others to a database query.

20 Claims, 6 Drawing Sheets

SYSTEM AND METHOD FOR HIGH PERFORMANCE TEMPLATE DRIVEN METADATA SCHEMA MAPPING AND DATA STORAGE FOR SURVEILLANCE AND SENSOR DEVICES

FIELD

The present disclosure generally relates to distributed surveillance systems, and relates in particular to metadata schema mapping and data storage for use with distributed surveillance systems.

BACKGROUND

The statements in this section merely provide background information related to the present disclosure and may not constitute prior art.

Distributed video surveillance and sensor network systems usually contain varieties of devices and generate a great amount of media data and metadata information continuously. To incorporate all these types of equipments, store information, and retrieve data requires technologies including data definition schema translation and mapping from XML to Relational, query transformation of XPath/XQuery to SQL, and multilevel content representation for complex data models.

The mechanisms used for data definition schema transformation include structure mapping and model mapping. There are different methods being proposed to solve the problems: Structure mapping, including "basic, shared & hybrid inlining technique", "X-Ray", "XML-DBMS", and "Cost-based approach"; and Model mapping, including "Edge approach", "Monet", "Xrel", and "XParent". Each method has strengths to solve one or more types of schema, but all have different advantages and disadvantages.

SUMMARY

A metadata database adaptor for use with a surveillance and/or sensor system is capable of adapting metadata messages of varying formats according to needs of metadata databases. In other aspects, a metadata data model template can allow a user to define a data definition that is used to map user defined data with the metadata data model template to form XML data schema. Template mapping knowledge can then be applied for fast XML data schema to non-XML database schema generation without translation processing. In yet other aspects, an application domain template can allow a user to define a query definition that can then be processed with a mapping of the application domain template to translate Xpath, Xquery, or others to a database query.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Distributed video surveillance and sensor network systems usually incorporate a variety of devices in terms of device types, vendors, communication protocols, and data specifications. Some functions that can be needed for such surveillance and sensor systems is to acquire, store, search, and retrieve data efficiently. The challenge is to be faster, more flexible, easier-to-use, and more accurate.

In general, new data models and operation flows need to be defined when a new surveillance and sensor network system is created. Most of the surveillance and sensor devices and systems can communicate with others using XML data format although the data schema can be different, but are usually similar.

A template driven system can efficiently create and manage data definition schema as well as search and access operation query definitions for distributed surveillance and sensor network devices. In order to handle a variety of types and complex data formats, such as industrial standard MPEG-7 and SensorML information, the system framework takes advantages of using multi-modal schema transformation and provides open interfaces for plug-in of multiple schema mapping and query transformation engines. It also provides multi-stage query pre-processing and post-processing for handling complex queries. In addition, it can be equipped with the capability to enhance template contents automatically via observing (mining) from user's operation historical data, creating indexes for data schema, and adding query statements. Templates can include application domain data model, data schema definition, query definition, index definitions, and data rendering mechanisms.

The data definition schema mapping mechanism in this system can allow multiple methods to plug-in and select it by dynamic declaration. It is time consuming process to define, translate, and test for a correct schema for a new system. Using a template approach can reduce the effort of the process while avoiding errors, and provide more high performance system. Pre-defined and tested generic templates can be used for different styles of schema and queries with proper indexes. When a new application data schema plan is being created, the system can take inputs from an administrator and process them with template knowledge and available plug-in methods to map to one or more predefined DB schema formats without time-consuming processes. A similar concept is used for query operations.

Since the system framework can have the capability to allow plug-in of different schema mapping and query transformation processor modules, it can handle many styles of schema, from simple definitions of simple devices to complex definitions like MPEG-7, and different query languages like XPath, XQuery, SQL, etc. to fit all the needs of video surveillance and sensor network applications.

Figure 1:
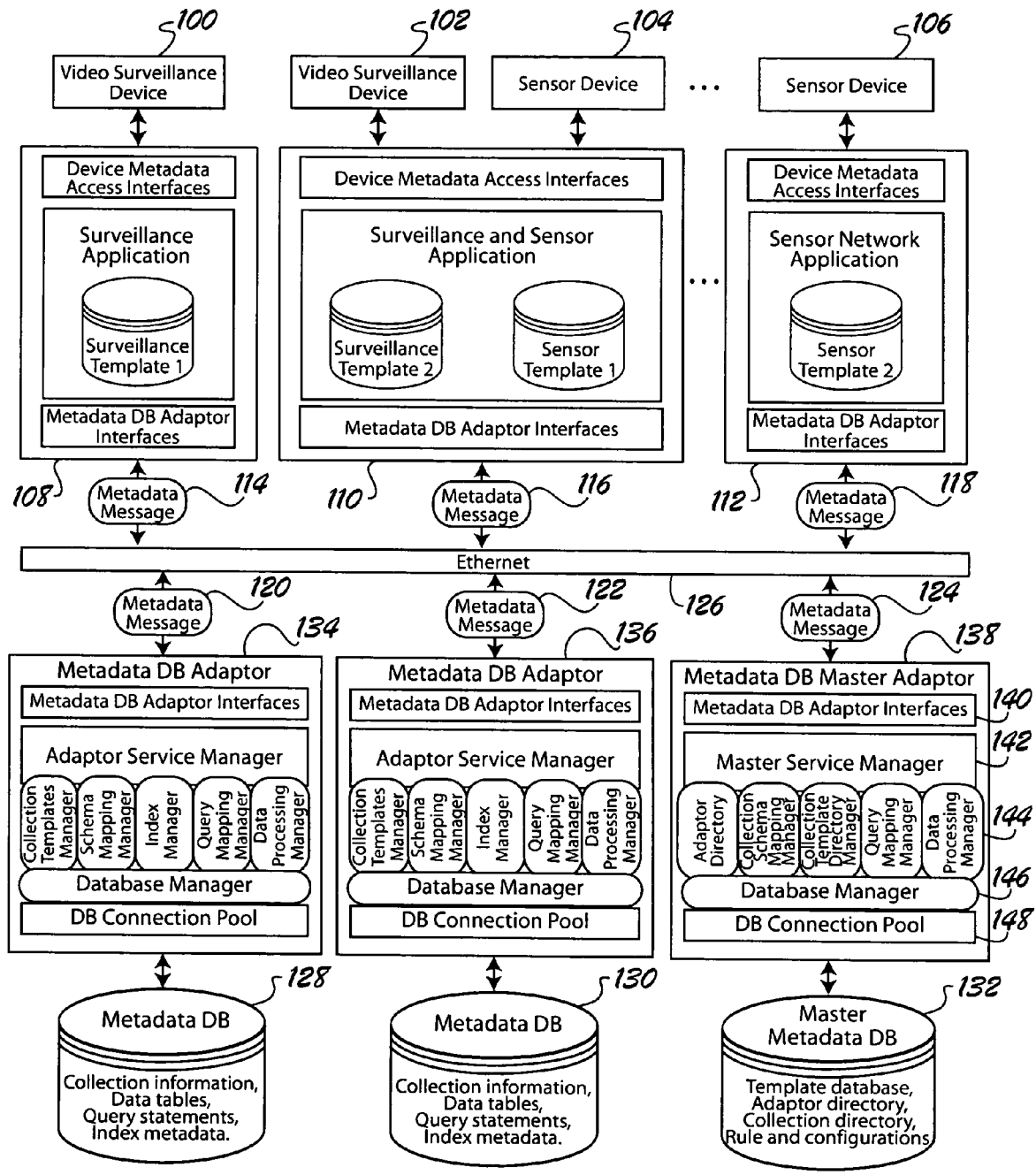
FIG. 1 is a block diagram illustrating an example distributed surveillance system.

Referring now to FIG. 1, a configuration for surveillance and sensor application systems can include various components. However, this configuration is merely an example. It is envisioned that many different configurations of such systems can be employed. Some components of the configuration include video surveillance devices 100-102 and sensor devices 104-106. Also, applications 108-112 can include a surveillance application 108, a surveillance and sensor application 110, and a sensor network application 112, each of which can have device metadata access interfaces, sensor and/or surveillance templates, and metadata database adaptor interfaces. Further, metadata messages 114-124 of varying formats can be communicated by Ethernet 126 and stored in databases 128-132. Still further, metadata database adaptors 134-138 can handle messages of varying formats and adapt them according to the needs of their respective databases.

According to the example configuration, there are two types of Metadata DB Adaptors in the distributed system: Regular DB Adaptor, such as adaptors 134-136; and Master DB Adaptor, such as adaptor 138. Both types of database adaptors can contain interfaces 140, service managers 142, functional modules 144, database managers 146, and database connection pools 148. In one respect, the regular database adaptor and master database adaptor differ in that the service manager of the regular database adaptor is an adaptor service manager, while the service manager of the master database adaptor is a master service manager. In another respect, the two types of adaptors differ in the types of their functional modules. Specifically, both types of adaptors can have query mapping manager modules and data processing manager modules. However, the regular database adaptor can have a collection templates manager module, a schema mapping manager module, and an index manager module. In contrast, the master database adaptor can have an adaptor directory module, a collection schema directory manager module, and a collection template directory manager module.

Metadata databases 128 and 130 can differ from master metadata database 132. In particular, databases 128 and 130 can each store collection information, data tables, query statements, and index metadata. In contrast, master metadata database 132 can store a template database, an adaptor directory, a collection directory, and rules and configurations.

The database management system (DBMS) can be any kind (relational, object, object-relational, file, etc.). SQL and relational DB schema are used as examples herein, but it should be readily understood that any kind of DBMS combined with the template approach can save effort and time for users and for field deployment by reducing errors and facilitating the deployment process.

The functional modules of regular metadata database adaptors 134-136 can have specialized functions and, in some cases, be designed to interact with modules of the master metadata database adaptor. For example, a collection template manager module can manage collection creation, modification, and deletion in a local metadata DB, and post collection registration to remote master DB adaptor 138. Also, a schema mapping manager module can handle mapping, translation, and generation of data definition schema to XML schema and to database data schema like relational DB schema. If the data definition schema is based on an existing template, the process time can be reduced using pre-processed mapping stored in the template. Schema mapping manager module can also contain a shared memory module to store active schema mapping metadata for other operation modules to use. It can reduce the re-processing time for each operation, and provide high performance schema processing and generation. Further, an index manager module can provide DB table index creation and deletion management. It can also have an intelligent mining feature to look into query operation historical data and learn from query pattern data and search operation time. It can determine if a new index needs to be created for enhancing the search performance when the historical data of search operation time are over a pre-defined threshold.

Modules common to both types of adaptors can provide functionalities useful to both types of modules. For example, a query mapping manager can handle mapping, translation, and generation of query criteria to XPath/XQuery and to database query languages like SQL. It can save a great amount of time if the query criteria are based on the existing template. Query manager module can also have an intelligent mining feature to look into query operation historical data and learn from query pattern data to determine if a new query template is needed to generate query criteria.

Functional modules unique to the master database adaptor can provide several directory services. For example, these modules can include an adaptor directory, a collection template directory, a schema directory, a query template directory, etc.

Figure 2:
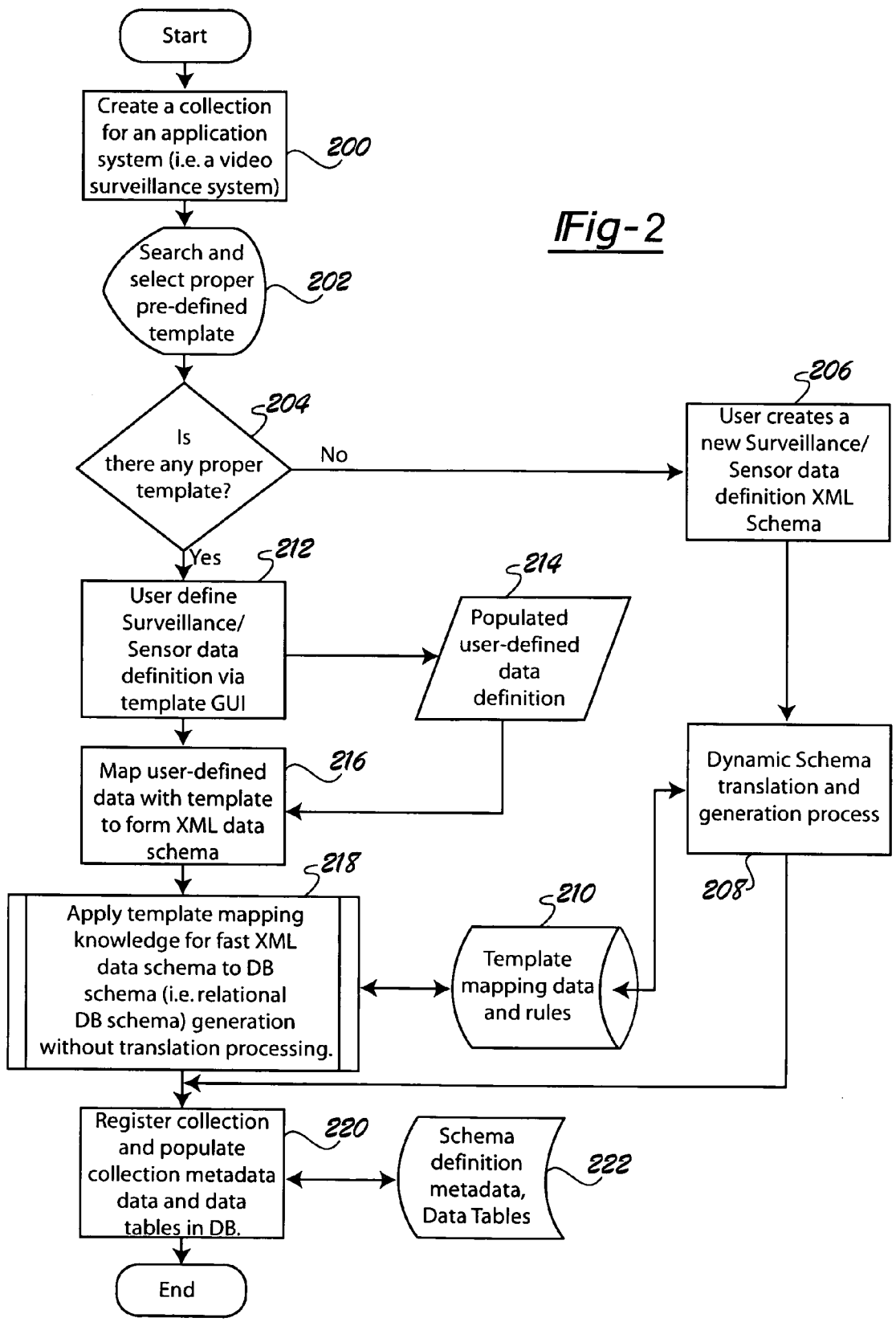
FIG. 2 is a flow diagram illustrating an example process flow for collection creation.

Turning now to FIG. 2, an example process flow for collection creation can be template driven. At step 200, a collection can be created for an application system, such as a video surveillance system. At step 202, a proper predefined template can be searched for and selected. If there is no proper predefined template at 204, then the user can create a new Surveillance/Sensor data definition XML schema at step 206. A dynamic schema translation and generation process at step 208 produces template mapping and data rules 210. However, if there is a proper template at 204, then the user can define a surveillance/Sensor data definition via a template GUI at step 212. Then, a user-defined data definition is populated at 214 and used at step 216 to map the user defined data with the template to form XML data schema. Then, at step 218, it is possible to apply template mapping knowledge for fast XML data schema to DB schema (e.g., relational DB schema) generation without translation processing. Then, at step 220, the collection can be registered and populated with metadata and data tables 222 in the DB.

Figure 3:
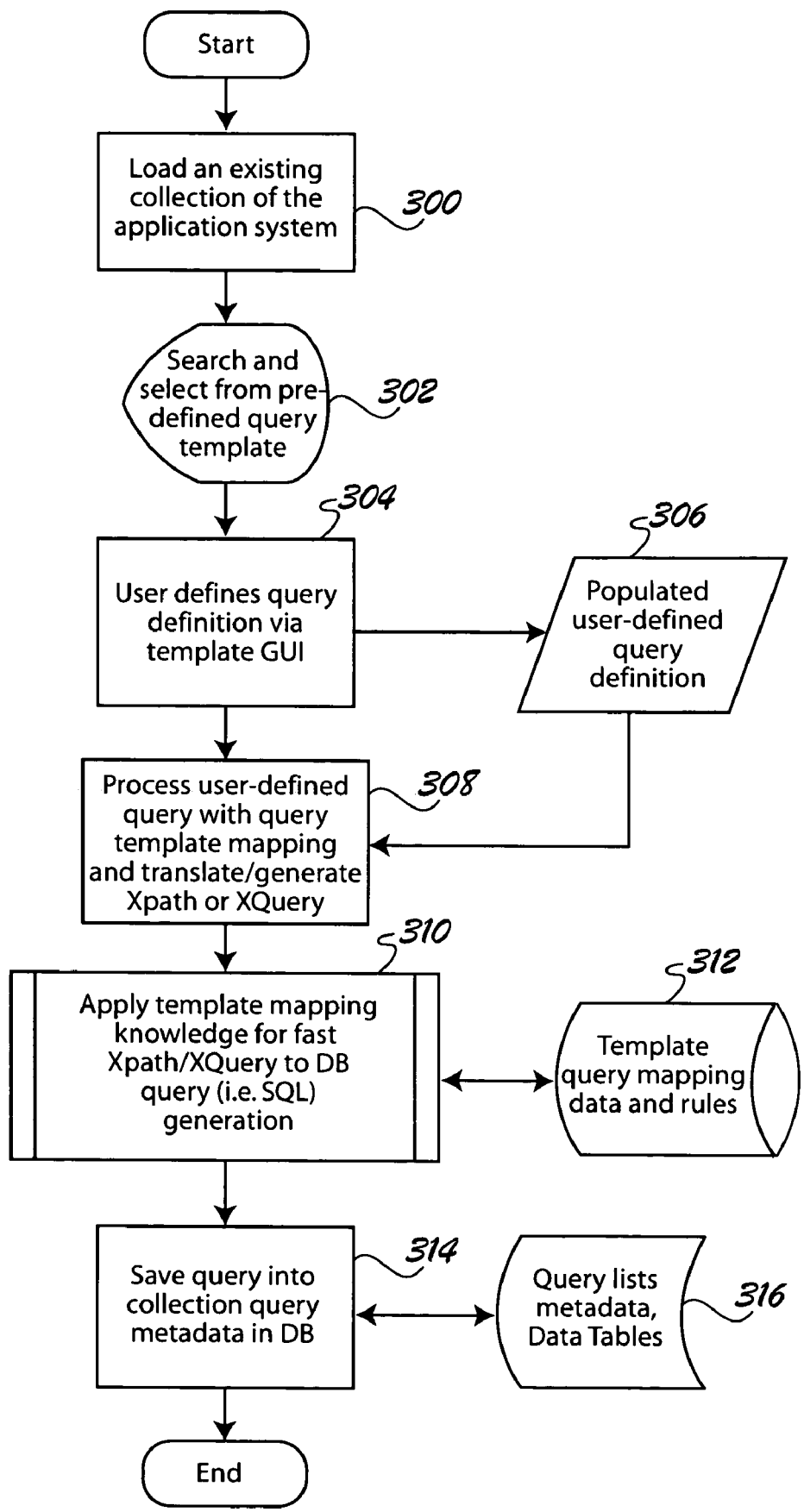
FIG. 3 is a flow diagram illustrating an example process flow for query criteria generation can also be template driven.

Turning now to FIG. 3, an example process flow for query criteria generation can also be template driven. Starting at step 300, an existing collection of the application system can be loaded. A search for a predefined query template can be conducted at 302 and a template can be selected. Then, a user can define a query definition at step 304 via a template GUI. A populated user-defined query definition 306 can then be processed at step 308 with the query template mapping and translate/generate Xpath or Xquery. At step 310, template mapping knowledge 312, including template mapping data and rules, can be applied for fast Xpath/Xquery to DB query (i.e., SQL) generation. Then, the query can be saved at step 314 into collection query metadata in the DB, such as query lists metadata and data table 316.

Figure 4:
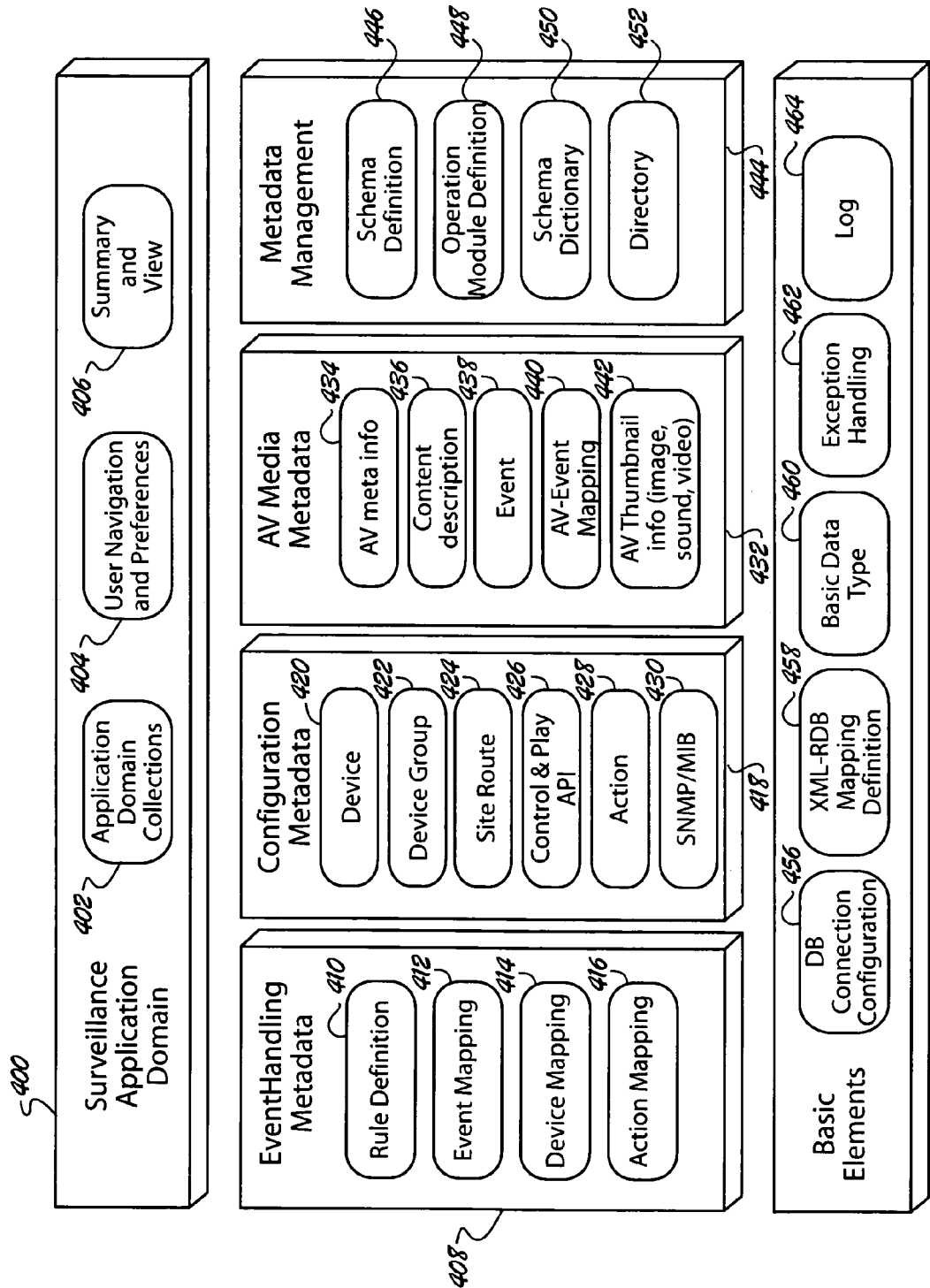
FIG. 4 is a block diagram illustrating an example data model template for a video surveillance system.

Turning now to FIG. 4, an example data model template for a video surveillance system can provide mapping data and rules for describing data. For example, a surveillance application domain 400 can include application domain collections 402, user navigation and preferences 404, and summary and view 406. Also, event handling metadata 408 can include rule definition 410, event mapping 412, device mapping 414, and action mapping 416. Further, configuration metadata 418 can include device 420, device group 422, site route 424, control and play API 426, action 428, and SNMP/MIB 430. Yet further, AV media metadata 432 can include AV metadata information 434, content description 436, event 438, AV-event mapping 440, and AV thumbnail information 442 (i.e., image, sound and video). Further still, metadata management 444 can include schema definition 446, operation module definition 448, schema dictionary 450, and directory 452. Finally, basic elements 454 can include database connection configuration 456, XML-RDB mapping definition 458, basic data type 460, exception handling 462, and log 464.

Figure 5:
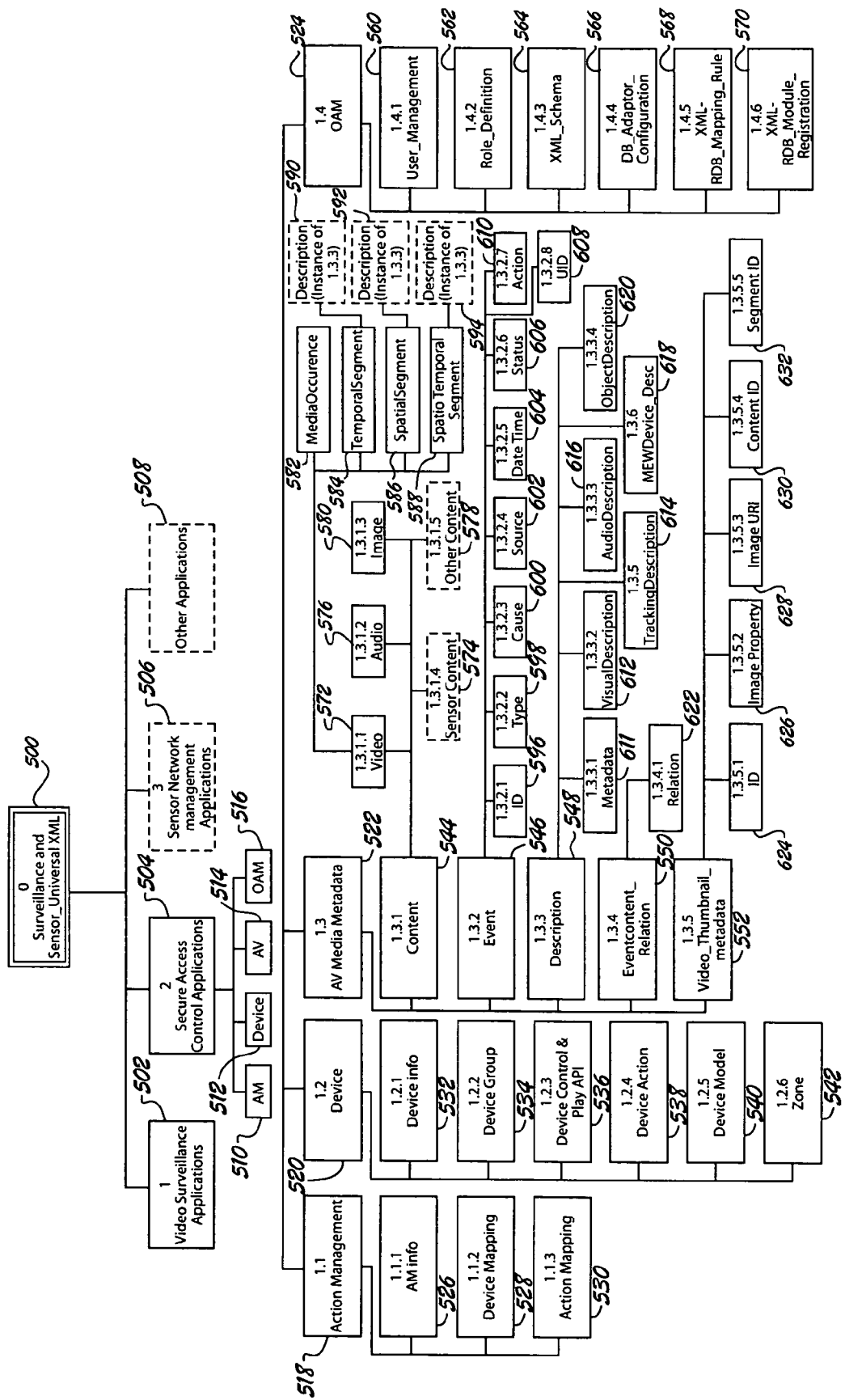
FIG. 5 is a block diagram illustrating an example application domain template for a video surveillance system.

Turning now to FIG. 5, an application domain template can provide mapping data and rules for describing an application domain. For example, Surveillance and Sensor_UniversalXML 500 can include video surveillance applications 502, secure access control application 504, sensor network management applications 506, and other applications 508. Also, secure access control applications can include AM 510, device 512, AV 514, and OAM 516. Further, video surveillance applications 502 can include Action Management (AM) 518, device 520, AV media metadata 522, and OAM 524. Yet further, AM 518 can include AM info 526, device mapping 528, and action mapping 530. Further still, device 520 can include device info 532, device group 534, device control and play API 536, device action 538, device model 540, and zone 542. Yet even further, AV media metadata can include content 544, event 546, description 548, EventContent_Relation 550, and Video_Thumbnail_metadata 552. Yet further still, OAM 524 can include User_Management 560, Role_Definition 562, XML_Schema 564, DB_Adaptor_Configuration 566, XML-RDB_Mapping_Rule 568, and XML-RDB_Module_Registration 570.

AV media metadata 522 can be especially rich. For example, content 544 can include video 572, sensor content 574, audio 576, other content 578, and image 580. Also, video 572 can include media occurrence 582, temporal segment 584, spatial segment 586, and spatio temporal segment 588, while each of segment 584-588 can include instances of description 590-594. Further, event 546 can include ID 596, type 598, cause 600, source 602, date/time 604, status 606, UID 608, and action 610. Still further, description 548 can include metadata 611, visual description 612, tracking description 614, audio description 616, NEWDevice_Desc 618, and object description 620, while EventContent_Relation 550 can include the relation 622. Finally, Video_Thumbnail_Metadata 552 can include ID 624, Image_Property 626, Image_URL 628, Content_ID 630, and Segment_ID 632.

In general, video surveillance systems produce and interact with video media data and video analysis data. MPEG-7 is one of the industry standards for describing multimedia information of media including video, and it is used by many video analysis and recognition systems to describe the media information. Due to the complexity of MPEG-7 data definition schema, designing an efficient MPEG-7 information data repository system is a challenge.

Figure 6:
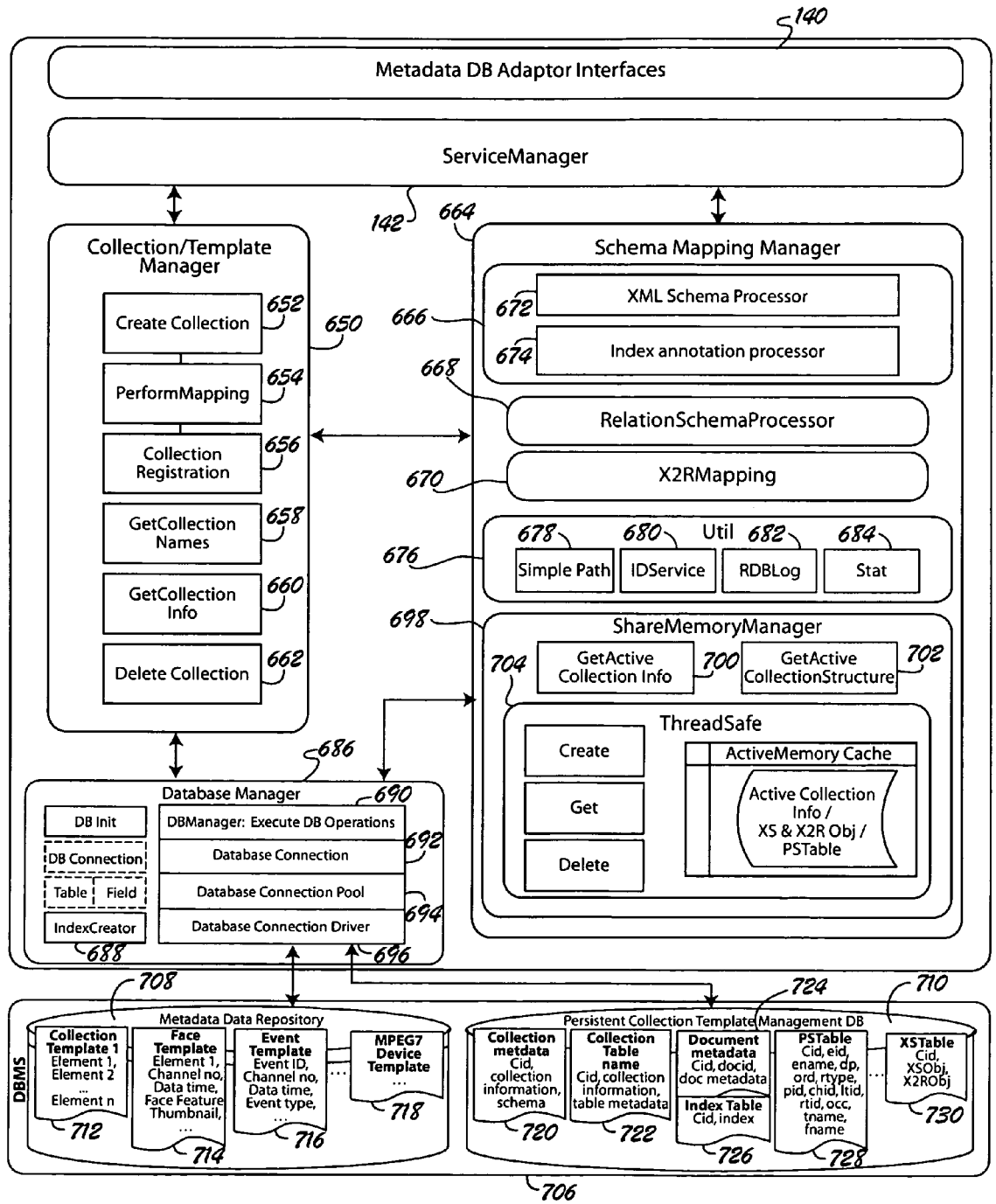
FIG. 6 is a block diagram illustrating a metadata database adaptor architecture.

Turning now to FIG. 6, an architecture of a metadata database adaptor can have various components. For example, it can have metadata database adaptor interfaces 140 and a service manager 142. It can also have a collection/template manager module 650 that creates a collection at step 652, performs mapping at step 654, performs collection registration at step 656. Module 650 can contain functions 658-662 for getting collection names, getting collection information, and deleting collections. Further, metadata schema mapping manager module 664 can have an Xschema creator 666, a relational schema processor 668, and X2R Mapping 670 for mapping between the Xschema and relational schema. Xschema creator 666 can have an XML schema processor 672 and an index annotation processor 674. Still further, it can have utilities modules 676 that can include simple path 678, ID service 680, RDBLog 682, and Stat 684. Yet further, database manager module 686 can have an index creator 688 with DB Inti, DB Connection, Table, and Field capabilities, A DB manager 690 for executing DB operations, database connection 692, database connection pool 694, and database connection driver 696. Even further, module 664 can have a share memory management module 698 that can have instructions 700-704 for getting active collection information, getting an active collection structure, and threadsafe creation, getting, and deletion of an active collection in an active memory cache. Finally, database management system 706 can include a metadata repository 708 and a persistent collection template management database 710. Metadata repository 712 can have: (a) a collection template 712 of elements; (b) a face template 714 with channel number, data time, face feature, thumbnail, and other information, (c) an event template 716 with event ID, channel number, data time, event type, and other information; (d) an MPEG7 device template 718; and (e) others. Template management database 710 can have: (a) collection metadata 720, including collection ID, collection information, and schema; (b) collection table name 722, including collection ID, collection information, and table metadata; (c) document metadata 724, including collection ID, document ID, and document metadata; (d) index table 726, including collection ID and index; (e) PSTable 728, including collection ID, eid, ename, dp, ord, rtype, pid, chid, ltid, rtid, occ, tname, and fname; and (f) XSTable 730, including collection ID, XS object, and X2R object 730.

The systems and methods described above provide several advantages over prior systems and methods. For example, these systems and methods provide an easy and efficient field programmable platform to create and manage metadata structure for DB storage. Also, template driven mapping can reduce the difficulties and errors in creation of surveillance and sensor device metadata schema. Further a multi-modal mechanism in data definition schema transformation to DB storage can achieve high performance access and retrieval. Yet further, multi-level indexing and a multi-stage query processes achieve both efficient search and accurate search needs. Further still, the systems and methods can easily add/remove new types of video surveillance devices or sensor devices with minimum metadata collection configuration for different application domains. Finally, intelligent self-learning query discovery and mining mechanisms can be included for distributed surveillance and sensor data.

What is claimed is:

1. A surveillance and sensor application system comprising a metadata database adaptor embodiment as computer executable instructions on a memory of a computing device comprising:

at least two applications, including at least one of a surveillance application or a sensor network application, wherein the applications produce metadata messages of varying formats;

at least two metadata databases storing the metadata messages of varying formats, and at least two metadata database adaptors associated with the metadata databases and adapting the metadata messages of varying formats according to the needs of their respective databases;

an adaptor interface, embodiment as computer executable instructions on a memory of a computing device and executed by a processor, connecting with one or more applications and receiving metadata messages from the applications, wherein the metadata messages describe surveillance data obtained by a surveillance device, wherein the surveillance device monitors a security site to obtain the surveillance data;

a metadata database interface connecting with a metadata database device; and one or more functional modules adapting metadata messages of varying formats according to needs of the metadata database, wherein at least one of the functional modules employs a metadata data model template that allows a user to define a data definition that is used to map user defined data with the metadata data model template and form XML data schema so that template mapping knowledge can then be applied for fast XML data schema to non-XML database schema generation without translation processing, wherein at least one of the functional modules utilizes metadata data model template to operate the metadata database device to generate the non-XML database schema; and wherein at least on of the functional modules employs an application domain template that allows the user to define a query definition that can then be processed with a mapping of the application domain template to translate a query of a first query language to a database query of a second query language.

2. The system of claim 1, wherein the at least two metadata database adaptors include a regular metadata database adaptor and a master metadata database adaptor, wherein the regular metadata database adaptor contains a collection template manager module that manages collection, creation, modification, and deletion in its respective metadata database, and posts collection registration to the master metadata database adaptor.

3. The system of claim 1, wherein the database adaptors contain interfaces, service managers, functional modules, database managers, and database connection pools.

4. The system of claim 1, wherein at least one of the adaptors includes a schema mapping manager module that can handle mapping, translation, and generation of data definition schema to XML schema and to database data schema, wherein the schema mapping manager can dynamically select multiple mapping and transformation engines based on a template definition in order to take advantage of multimodal mapping and transformation engines.

5. The system of claim 4, wherein the schema mapping manager module has a shared memory module to store active schema mapping metadata for other operation modules to use.

6. The system of claim 1, wherein at least one of the adaptors includes an index manager module that provides metadata database table index creation and deletion management.

7. The system of claim 6, wherein the index manager module has an intelligent mining feature to look into query operation historical data and learn from query pattern data and search operation time.

8. The system of claim 7, wherein the index manager module determines if a new index needs to be created for enhancing search performance when the historical data of search operation time is over a pre-defined threshold.

9. The system of claim 1, wherein the adaptors include a query mapping manager that handles mapping, translation, and generation of query criteria to the first query language and the second query language.

10. The system of claim 9, wherein the query mapping manager module has an intelligent mining feature to look into query operation historical data and learn from query pattern data to determine if a new query template is needed to generate query criteria.

11. The system of claim 2, wherein at least one of the adaptors includes one or more directory services, including at least one of an adaptor directory, a collection template directory, a schema directory, or a query template directory.

12. A surveillance and sensor application system, comprising:

at least two devices, including at least one of a video surveillance device or a sensor device;

at least two applications, including at least one of a surveillance application or a sensor network application, wherein the at least two applications produce metadata messages of varying formats;

at least two metadata databases including a master metadata database and a regular metadata database, wherein the regular metadata database stores metadata contained in the metadata messages and the master metadata database only stores administrative data for managing the metadata;

at least two metadata database adaptors associated with the at least two metadata databases, and a template database having a plurality of templates, wherein each of the plurality of templates predefines a collection of database elements for at least a first database of the metadata databases and is associated with a preselected set of database performance operations of the metadata database that are specific to the collection;

wherein each of the plurality of templates allows a user to define a data definition to map user defined data with the collection of database elements of that template and form XML data schema so that template mapping knowledge can then be applied for fast XML data schema to non-XML database schema generation without translation processing;

wherein each of the at least two metadata database adaptors comprises:

an adaptor interface connecting with and receiving the metadata messages from at least one of the at least two applications;

a metadata database interface connecting with at least one of the at least two metadata databases; and one or more functional modules adapting the metadata messages of varying formats according to needs of at least one of the at least two metadata databases, wherein at least one of the functional modules selects a first template from the plurality of templates and creates the predefined database elements of the first template in the first database;

wherein the at least one of the functional modules populates the first template with the metadata contained in the metadata messages for storing the metadata in the first database and triggers the preselected set of database performance operations in the first database, wherein at least one of the functional modules employs an application domain template that allows the user to define a query definition that can then be processed with a mapping of the application domain template to translate a query of a first query language to a database query of a second query language.

13. The system of claim 12, wherein the at least two metadata database adaptors include a regular metadata database adaptor and a master metadata database adaptor, wherein the regular metadata database adaptor contains a collection template manager module that, in accordance with at least one of the plurality of templates, manages collection, creation, modification, and deletion in its respective metadata database, and posts collection registration to the master metadata database adaptor.

14. The system of claim 12, wherein the database adaptors contain interfaces, service managers, functional modules, database managers, and database connection pools.

15. The system of claim 12, wherein at least one of the adaptors includes a schema mapping manager module that can handle mapping, translation, and generation of data definition schema to XML schema and to database data schema, wherein the schema mapping manager can dynamically select multiple mapping and transformation engines based on a template definition in order to take advantage of multi-modal mapping and transformation engines.

16. The system of claim 15, wherein the schema mapping manager module has a shared memory module to store active schema mapping metadata for other operation modules to use.

17. The system of claim 12, wherein at least one of the adaptors includes an index manager module that provides metadata database table index creation and deletion management.

18. The system of claim 17, wherein the index manager module has an intelligent mining feature to look into query operation historical data and learn from query pattern data and search operation time.

19. The system of claim 18, wherein the index manager module determines if a new index needs to be created for enhancing search performance when the historical data of search operation time is over a pre-defined threshold.

20. The system of claim 12, wherein the collection of database elements predefined in each of the plurality of templates include a database table, an index, and a database schema.

* * * * *